(12) United States Patent
Karlsson et al.

(10) Patent No.: US 8,126,614 B2
(45) Date of Patent: Feb. 28, 2012

(54) SELECTIVE ANTI-LOCK BRAKING SYSTEM

(75) Inventors: Svante Karlsson, Västra Frölunda (SE); Lars Karlsson, Göteborg (SE); Sixten Berglund, Torslanda (SE)

(73) Assignee: Volvo Lastvagnar AB, Gothenburg (SE)

( * ) Notice: Subject to any disclaimer, the term of this patent is extended or adjusted under 35 U.S.C. 154(b) by 935 days.

(21) Appl. No.: 12/066,272

(22) PCT Filed: Sep. 8, 2006

(86) PCT No.: PCT/SE2006/001039
§ 371 (c)(1),
(2), (4) Date: Jun. 6, 2008

(87) PCT Pub. No.: WO2007/030073
PCT Pub. Date: Mar. 15, 2007

(65) Prior Publication Data
US 2008/0269994 A1  Oct. 30, 2008

Related U.S. Application Data

(60) Provisional application No. 60/596,205, filed on Sep. 8, 2005.

(51) Int. Cl.
*G05D 1/00* (2006.01)
(52) U.S. Cl. .......................................... 701/48
(58) Field of Classification Search .......... 701/48, 701/51; 180/338, 347
See application file for complete search history.

(56) References Cited

U.S. PATENT DOCUMENTS
4,676,353 A    6/1987   Matsuda
(Continued)

FOREIGN PATENT DOCUMENTS
DE        3065600 A1    8/1987
(Continued)

OTHER PUBLICATIONS
European Search Report for corresponding EP 06 78 4169.
(Continued)

*Primary Examiner* — Faye M. Fleming
(74) *Attorney, Agent, or Firm* — WRB-IP LLP

(57) ABSTRACT

Automatic mechanical transmission system for a vehicle with antilock braking which is configured to selectively decouple the drive train of the vehicle from the wheels of the vehicle. The system includes a first sensor for sensing at least one operational state of the vehicle, a second sensor for sensing a wheel-lock up condition of the vehicle, and a logic control unit. The logic control unit is configured to receive signals from the first and second sensors. When the first sensor communicates a first predetermined operational state of the vehicle and the second sensor communicates a wheel-lockup condition, the logic unit directs disengagement of the drive train from the wheels. Alternatively, when a second predetermined operational state of the vehicle and wheel lock-up condition is communicated, the logic control unit directs engagement of the drive train and the wheels.

17 Claims, 2 Drawing Sheets

U.S. PATENT DOCUMENTS

| | | | | |
|---|---|---|---|---|
| 4,825,989 A | * | 5/1989 | Frigger | 192/13 R |
| 4,899,279 A | * | 2/1990 | Cote et al. | 701/37 |
| 5,277,286 A | | 1/1994 | Yamamoto et al. | |
| 6,848,549 B2 | * | 2/2005 | Grass et al. | 192/3.63 |
| 2008/0312031 A1 | * | 12/2008 | Reith | 477/92 |

FOREIGN PATENT DOCUMENTS

| | | |
|---|---|---|
| DE | 10101858 A1 | 7/2002 |
| DE | 10157711 C1 | 2/2003 |
| DE | 10351376 A1 | 5/2004 |
| EP | 0983894 A2 | 3/2000 |
| FR | 2841834 A1 | 1/2004 |

OTHER PUBLICATIONS

International Search Report for corresponding International Application PCT/SE2006/001039.

International Preliminary Report on Patentability for corresponding International Application PCT/SE2006/001039.

* cited by examiner

SELECTIVE ANTI-LOCK BRAKING SYSTEM

The present application claims the benefit of U.S. Provisional Application No. 60/596,205 filed Sep. 8, 2005. Said application is expressly incorporated herein by reference in its entirety.

BACKGROUND AND SUMMARY

The present invention relates generally to braking systems, and more particularly to a method and apparatus for selectively disengaging a vehicle drive train from the wheels during wheel lock-up conditions.

Automatic and semi-automatic mechanical transmission (i.e. "AMT") control systems are known and which are controlled, at least in part, using electronic control systems based on discrete logic circuits and/or software controlled microprocessors. Gear selections and shift decisions are made based upon certain measured and/or calculated parameters known to the control system such as vehicle speed (or transmission output shaft speed), transmission input shaft speed, engine speed, rate of change of vehicle speed, rate of change of engine speed, throttle position, rate of change of throttle position, full depression of the throttle, actuation of the braking mechanism, currently engaged gear ratio, and the like. Examples of such automatic transmission control systems for vehicles are disclosed in U.S. Pat. Nos. 4,361,060; 4,551,802; 4,527,447; 4,425,620; 4,463,427; 4,081,065; 4,073,203; 4,253,348; 4,038,889; 4,226,295; 3,776,048, 4,208,929; 4,039,061; 3,974,720; 3,478,851 and 3,942,393, the disclosures of which are all hereby incorporated by reference.

Similarly, automatic vehicle brake anti-skid or antilock braking systems (ABS) are known. Generally, as locking-up or skidding of a vehicle's wheels occurs, actual or impending wheel lock-up is sensed and the wheels are allowed to roll-up to vehicle speed prior to the vehicle brakes being reapplied. Examples of anti-skid or anti-lock brake systems are described in U.S. Pat. Nos. 3,767,270; 3,768,872; 3,854,556; 3,920,284; 3,929,382; 3,996,267, and 3,995,912, the disclosures of which patents are hereby incorporated by reference. U.S. Pat. No. 4,899,279, also hereby incorporated by reference, discloses vehicle AMT and ABS systems that during actual or impending wheel lock up, the ABS system communicates with the vehicle AMT control system to decouple the vehicle engine, or drive train, from the wheels of the vehicle. Decoupling of the vehicle engine from the wheels reduces the tendency of the inertia of the engine and clutch to hinder the wheels' ability to roll-up to vehicle speed.

While decoupling of a vehicle's engine or drive train from the vehicle's wheels to allow roll-up is beneficial under most circumstances, there are circumstances wherein decoupling can be disadvantageous. For example, if a heavy semi-truck is driven down a steep grade and an impending or actual wheel lock up occurs (as may occur as the result of the engine brake or a loose road surface), decoupling of the vehicle engine from the wheels can be disadvantageous. More specifically, if the wheels of the semi-truck are decoupled from the engine, the truck will momentarily lose the benefit of the engine brake, a situation that can result in the truck lurching forward and/or cause the operator to lose control of the vehicle. Additionally, the disengagement of the clutch removes the resistance to motion provided by the coupling of the driveline with the inertia of the engine. This engine inertia will cause the vehicle to accelerate slower when connected to the driveline. Likewise, this situation can cause the operator to lose control or at least feel uncomfortable when this occurs. The referenced engine may serve as an example of a more general prime mover of the vehicle, a term which encompasses any power plant that provides power to the driveline of the vehicle or other power consuming components of the vehicle. Some examples of prime movers are diesel engines, electric motors, and hybrid power systems.

Therefore, the current invention recognizes the need for a vehicle AMT and ABS system capable of selectively decoupling a vehicle engine from the vehicle wheels, but only under appropriate conditions.

In accordance with the presently disclosed invention(s), the drawbacks of the prior art are minimized by providing a control system, preferably an electronic control system, and a control method, for automatic mechanical transmission systems (AMT's) and antilock braking systems (AB S's) wherein coupling/decoupling of a vehicle engine from the wheels of a vehicle is executed upon measured and/or calculated parameters including, but not limited to, input signals indicative of wheel speed, angle of inclination/declination of the vehicle, operation of the brakes, engine speed, transmission input shaft speed and transmission output shaft speed. Other inputs/parameters, such as signals indicative of throttle or brake positions, rate of change of throttle position or brake positions, condition of the master clutch, currently engaged gear ratio, vehicle mass, vehicle axle configuration (2×4, 2×6, etc.), engine brake power, and the like can also be used to make decisions for control of the AMT and/or ABS systems. The method provides for sensing a wheel lock-up condition, the vehicle status at the time of wheel lockup (vehicle mass, inclination/declination, and the like), and controlling the AMT or ABS in response thereto.

The above is accomplished by providing the electronic control unit with input means for receiving a signal indicative of a wheel lock-up, such as from a vehicle anti-lock brake system and logic to process the input signals to determine the presence or absence of a wheel lock-up condition and the operational status of the vehicle (vehicle mass, inclination/declination, and the like). Upon sensing of a wheel lock-up and vehicle status, e.g., on a steep decline or flat road, the control method causes the vehicle clutch, or other selectively disengagable drive train coupling, to remain engaged to prevent any undesirable forward lurch, or to disengage to allow the wheels to roll-up to vehicle speed. Upon sensing that a wheel lock-up is the result of a vehicle's engine brake, e.g., as may occur as the result of icy or loose road conditions, the control method can cause the ABS to control or modify the vehicle's engine brake. The method further includes sensing termination of wheel lock-up.

In at least one embodiment, the invention takes the form of a method for overriding antilock effects of an antilock braking system on a heavy vehicle, such as a commercial truck, that includes an automatic manual transmission. The method includes detecting a wheel slip event sufficient to initiate an antilock effect from the antilock braking system. Those persons skilled in these arts will understand that examples of such events include a wheel skidding on slippery pavement or slipping on loose gravel, both of which are events that ABS systems normally detect. It is then determined whether or not the heavy vehicle is descending a hill with declination that exceeds a predetermined declination value. If it is determined that the hill is sufficiently steep, initiation of the antilock brake effects will be overridden; that is, braking effect will continue to be applied to the slipping wheels against normal ABS protocol. An important motivation for his procedure is that it would feel abnormal to the driver, with potentially unnerving effects, if braking forces were suddenly removed without notice to the driver while the heavy vehicle is traveling downhill.

The thresholds or predetermined declination values above which ABS procedures are aborted advantageously fall within the range of about five to eight percent, which comprises comparatively steep road grades.

As a compliment to these steps, it is also contemplated that when it is not determined that the vehicle is descending a sufficiently steep hill, ABS prophylactic measures will be allowed to initiate and execute when requisite wheel slippage is detected. This is especially true if the heavy vehicle is traveling on substantially level or flat ground.

Accordingly, the present invention provides an apparatus and method for controlling vehicle AMT and ABS systems to selectively disengage a vehicle engine from a vehicle's wheels under wheel-lock up conditions.

DETAILED DESCRIPTION

Figure 1:
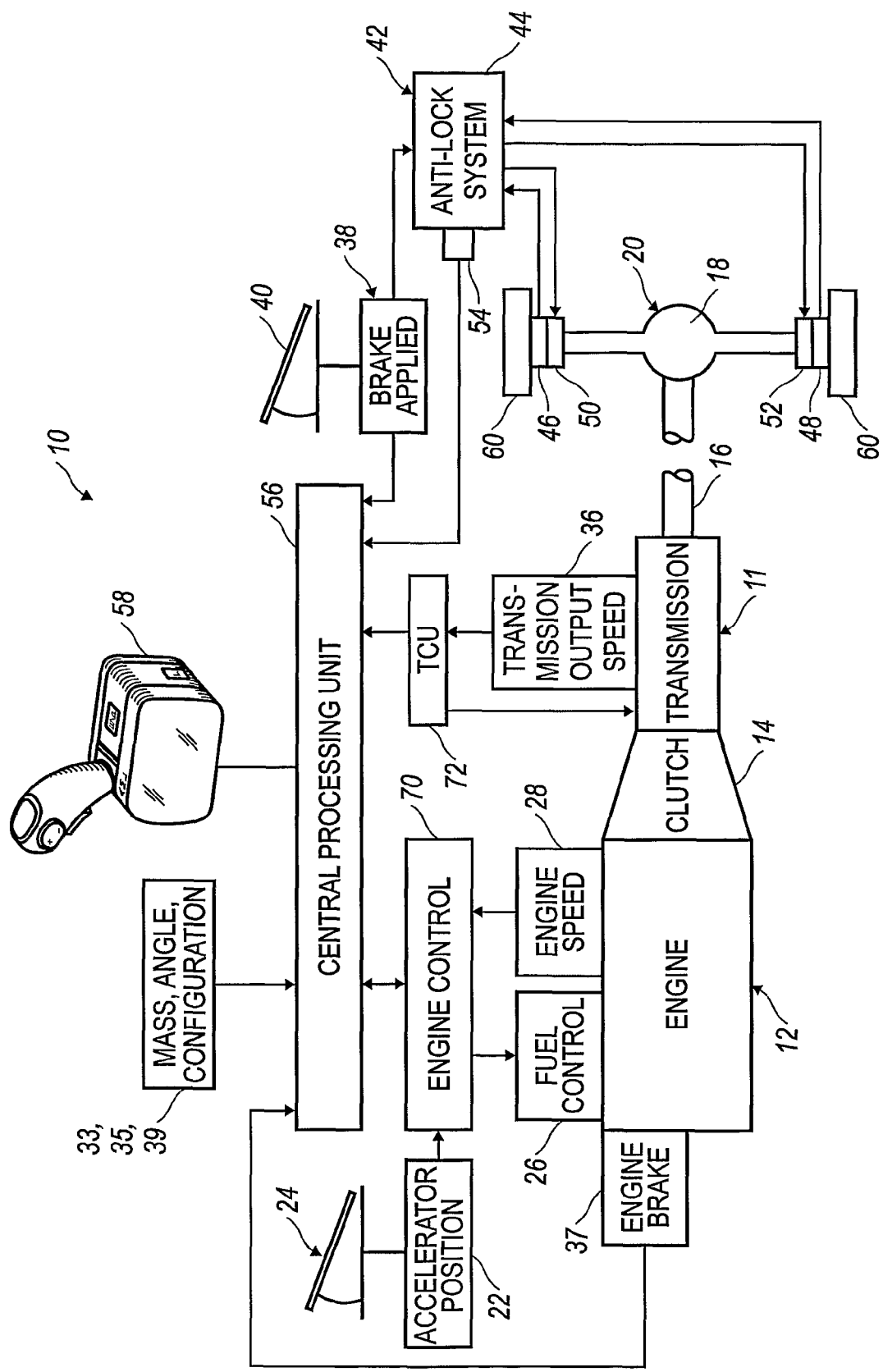
FIG. 1 is a schematic illustration of components of the automatic mechanical transmission control system and anti-lock braking system of the present invention.

FIG. 1 schematically illustrates a vehicular automatic mechanical transmission system 10 including an automatic multi-speed change gear transmission 11 driven by a prime mover or engine 12, such as a well known diesel engine, through a master clutch 14. The output of automatic transmission 11 is output shaft 16 which is adapted for driving connection to an appropriate vehicle component such as the differential head assembly 18 of a vehicle drive axle 20. The above-mentioned power train components are acted upon and monitored by several devices each of which will be discussed in greater detail below. These devices include an accelerator pedal position monitoring assembly 22 which senses position of the operator controlled accelerator pedal 24, a fuel control device 26 for controlling the amount of fuel to be supplied to the engine 12, an engine speed sensor 28 which senses the rotational speed of the engine, a clutch operator (not shown) which engages and disengages master clutch 14 and which may also supply information as to the status of the clutch, a transmission input shaft speed sensor (not shown), a transmission operator (not shown) which is effective to shift the transmission 11 into a selected gear ratio and which may provide a signal indicative of the currently engaged gear ratio, and a transmission output shaft speed sensor 36. Alternatively, the currently engaged ratio may be determined by comparison of transmission input shaft to output shaft speeds.

Additionally, the accelerator position monitoring assembly communicates with the engine control module 70, which in turn is in communication with the central processing unit 56 as well as the fuel controller 26 and engine speed sensor 28. A transmission control unit (TCU) 72 is capable of communicating with the transmission 11 and the transmission operator as well as other sensors monitoring the transmission such as the transmission output speed sensor 36. While shown as three separate units, the central processing unit 56, TCU 72, and engine controller 70 can be combined into a single unit. Alternatively, these individual units may include several control units. For example, the TCU 72 can have two control units, one designed for gear selection and another for gear shifting. Gear shifting describes the actual engagement of the mechanical elements of the transmission 11. For example, gear shifting is the process of actually moving the mechanical parts of the transmission 11 in the proper order to engage or disengage a gear or otherwise manipulate the transmission 11 in response to a given request or instruction. Gear selection is the process of selecting the desired gear or decision to maintain the current gear state. Furthermore, gear selection can consider various parameters in order to determine the proper gear to engage. In an automated transmission 11, transmission control is carried out by having a gear selection strategy used to determine what gear should be engaged, then implementing a gear shifting strategy that actually carries out the requested shift in the transmission 11.

A vehicle brake monitor 38 can be provided for sensing actuation of the vehicle brake pedal 40. The vehicle can also be provided with vehicle operational sensors 33, 35, 37, and 39 for sensing and communicating vehicle operational state, which can include, but is not limited to: vehicle mass, angle of inclination/declination of the vehicle, engine braking power, vehicle configuration (2×2, 2×4, 2×6, etc.), and the like. Here, vehicle configuration refers to the number of driven wheels as compared to total number of wheels of the vehicle. In the situation where there is a 2×6 configuration, one pair of wheels can be elevated as compared to the other pairs of wheels. These elevated wheels may not be completely elevated, but remain in contact with the road surface with a reduced amount of force as compared to the remaining wheels. Thus, the pair with reduced contact force with the road surface are more likely to lock-up. In an exemplarily embodiment, the ABS system 42 communicates which wheels are locked, and a determination is made whether to disengage the clutch based on this information. If the wheels that have locked up are not the drive wheels of the vehicle, then the clutch is preferably left engaged. This information may be used independently or in addition to other information as described below for determination of when the clutch should be disengaged.

The vehicle may also be provided with a vehicle anti-lock system of known design and generally indicated by reference numeral 42. Briefly, the anti-lock system includes a central anti-lock logic unit 44 which receives input signals from various wheel speed sensors such as sensors 46 and 48 for determination as to the existence of an actual or impending wheel lock-up condition and issues output commands to brake operators 50 and 52 to optimize stopping and control of the vehicle. If the vehicle is equipped with an anti-lock system 42, the system may provide an input signal by means of skid or lock-up sensor 54 to the AMT system 10.

The above-mentioned AMT system supplies information to, or accepts commands from, a central processing unit or controller 56. The central processing unit 56 may include analog and/or digital electronic logic hardware or, preferably, is microprocessor-based and utilizes logic in a software mode. The central processing unit 56 also receives information from a shift control assembly 58 by which the vehicle operator may select a reverse (R), neutral (N), automatic (A) or manual (M) mode of operation of the vehicle.

An electrical power source (not shown) and/or source of pressurized fluid (not shown) provide electrical and/or pneumatic power to the various sensing, operating, and/or processing units. In another embodiment, separate controls may be provided for the engine and transmission. These two separate controls are preferably linked together so that the control units may share relevant information with each other. The descriptions provided above are given as examples of possible configurations of controllers and other control configurations are considered within the scope of the presently disclosed invention. Drive train components and controls therefore of the type described above are known in the prior art and may be appreciated in greater detail by reference to above-mentioned U.S. Pat. Nos. 3,478,851; 3,776,048; 4,038,889; 4,081,065; 4,226,295 and 4,361,060.

Sensors 22, 28, 33, 35, 38, 39 and 54 may be of any known type or construction for generating analog or digital signals proportional to the parameter monitored thereby. Similarly, operators 26, 37, 50 and 52 may be of any known electrical, pneumatic or electropneumatic type that executes operations in response to command signals from processing unit 44, 56, 70, or 72.

The primary purpose of the central processing unit 56 is to select, in accordance with a program (i.e. predetermined logic rules) and current or stored parameters, whether the engine should remain engaged with the wheels during a wheel lock-up condition or disengaged during a wheel lock-up condition, and, if necessary, to command such engagement/disengagement based upon the current and/or stored information.

In the event of a wheel lock-up or skid condition, it is important that the AMT system control logic be provided with a method to detect such a condition as the input signal from sensor 36 indicative of the rotational speed of the transmission output shaft may not provide a true indication of the velocity of the vehicle and thus the system may attempt undesirable downshifts of the transmission 11. Further, depending upon the specific operational state of the vehicle learned from sensors 33, 35, 37 or 39, it can be desirable that the engine 12 and clutch 14 remain connected or are disconnected from the braked vehicle drive wheels 60.

Sensing of an actual or impending wheel lock-up condition by the AMT central processing unit 56 is relatively simple and preferably comprises receiving a signal from a vehicle antilock system 42. After detecting that a skid or wheel lock-up condition exists, it is necessary for the system 10 to respond to the detected condition in as safe a manner as possible. Where it has not already done so, the operational logic or method of controlling the AMT system 10 in response to the detection of a skid condition is to first determine the operational state of the vehicle. That is, determine whether the vehicle is descending a steep gradient or traversing a relatively flat road, determine whether the vehicle is transporting a heavy or a light load, determine whether there is available engine brake power, or determine the configuration of the vehicle (whether the vehicle is being operated as a 2×4, a 2×6, etc.), and the like. Next, depending upon the operational state of the vehicle, the clutch 14 can remain either engaged (e.g., in the event of a steep descent) or disengaged in dependence upon the actual situation. Maintaining the clutch in the engaged position generally allows the vehicle to continue to benefit from the use of vehicle engine brake and/or engine inertia and prevents any lurching that may occur if the clutch were allowed to be disengaged. Alternatively, if traversing a flat surface, release of the clutch allows the vehicle operator to ride out the skid episode without having to fight engine torque or worry that the transmission system 10 will downshift during the skid. This can be important as releasing the clutch 14 allows the braked wheels 60 to roll-up to vehicle speed unimpeded by the inertia of the engine 12 and input plates of clutch 14. Alternatively, where the CPU determines that wheel lock up has occurred as the result of the vehicle engine brake (as can occur on icy or wet roads), the engine brake controller 37 can be asserted to prevent and to adjust the engine braking system to prevent further wheel lock-up.

Although the AMT system 10 has been described as utilizing a microprocessor-based central processing unit 56 and the methods and operations are carried out as software modes or algorithms, the operations can also be carried out in electronic/fluidic logic circuits comprising discrete hardware components.

Figure 2:
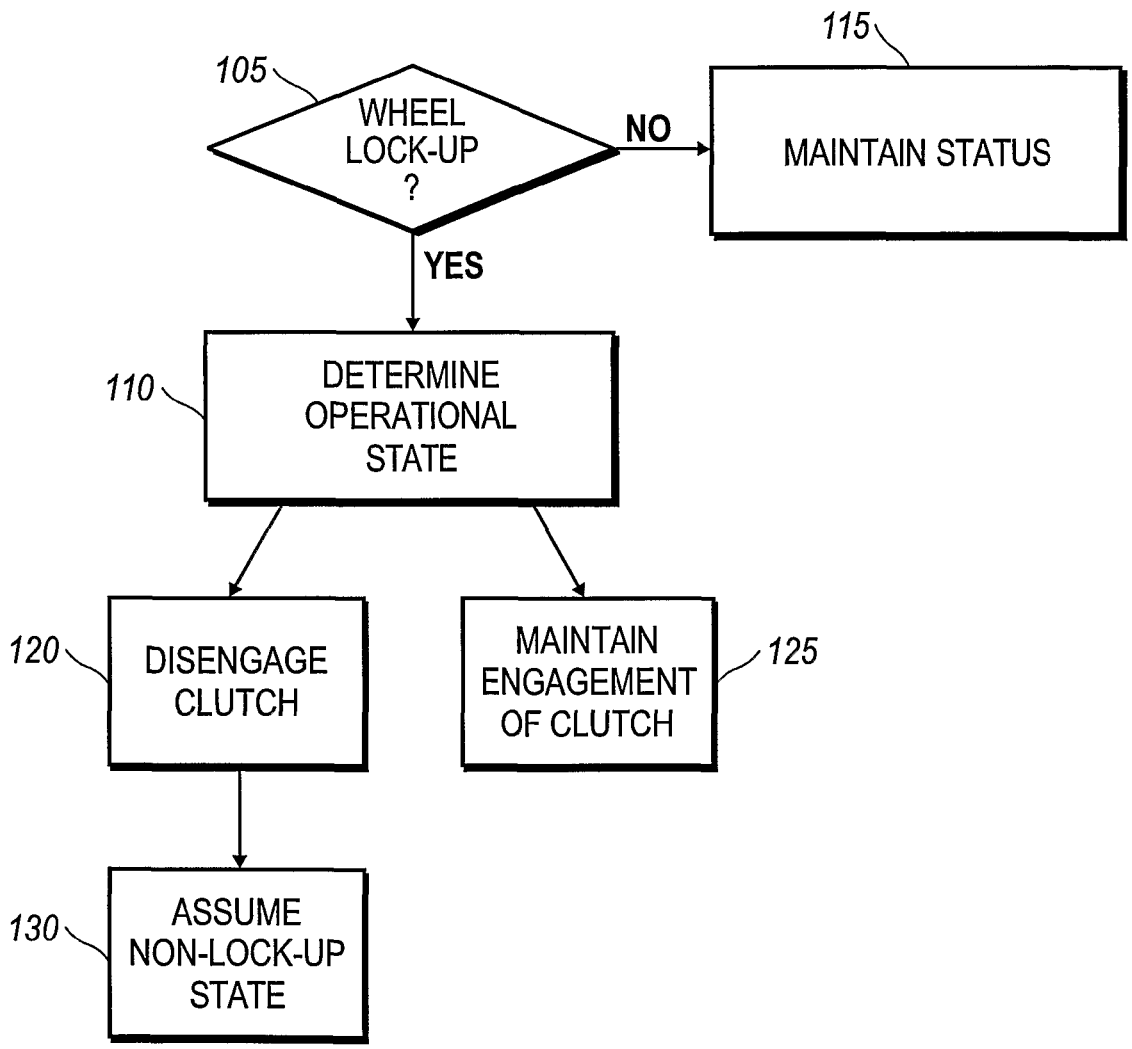
FIG. 2 is a flow chart illustrating communications between sensors and a logic control unit according to the invention.

A method for selectively decoupling a vehicle drive train from the wheel of the vehicle in the event of a wheel lock-up condition is generally illustrated in FIG. 2. The method determines if a wheel lockup condition is present (block 105) and maintains the current status (block 115) if no wheel lockup is detected or determines the operational state (block 110) if wheel lockup is present. As can be seen, if a vehicle wheel lock-up condition is present (block 105), the central processing unit determines the operational state of the vehicle (block 110), that is, whether the vehicle is descending a steep incline, whether the vehicle is transporting a heavy load, whether the vehicle has engine braking power, or the configuration of the vehicle. Based on the data provided by the sensors, the CPU directs controllers to either disengage the drive train from the wheels (block 120) or maintain the engagement of the drive train and the wheels (block 125). If the drive train is disengaged, the disengaged position can be maintained until that time at which the wheel lock-up condition has ceased and the clutch has reengaged (block 130). Alternatively, where the central processing unit determines that conditions warrant that the drive train remains engaged, a procedure is performed to determine the cause of the wheel lock-up condition (e.g. engine brake or slippery surface). Where it is determined that the cause of the wheel lock-up is the result of the engine brake, the CPU directs a controller to modify the amount of engine braking. Once the wheel lock-up conditions have ceased, normal operations may resume (block 130).

When determining whether to disengage the clutch or to leave it engaged, a combination of the various operating conditions may be controlling or a single dominant operation condition might be the determining factor, hi at least one embodiment, the angle of declination is used as the determining factor. If the angle of declination is less than a first predetermined value, the clutch and driveline will remain engaged. Yet when the vehicle is on a downward slope of greater than a first predetermined value, the clutch will not be disengaged. However, in a preferred embodiment, the angle of declination along with the engine speed is used to determine when the clutch will be disengaged. While the engine speed is above a predetermined value and the angle of declination is greater than a first predetermined value, the clutch will remain engaged. When the engine falls below a first predetermined speed, the clutch will be disengaged. The primary reason for disengaging the clutch at this point is to prevent the engine from stalling. When the angle of declination is above a second predefined value which is greater than the first predetermined value, the clutch will remain engaged until the engine speed falls below a second predetermined speed. Yet, if the angle of declination is above a third predetermined value the clutch will remain engaged. An example of the logic is presented below. If the vehicle is on a road having an angle of declination that is less than a five percent grade, the clutch will disengage when a wheel lock up condition is detected. When the grade exceeds five percent then a determination is additionally based on the engine speed. If the engine speed remains above a value such as 1800 rpm, the clutch will remain engaged; if the engine speed drops below second predetermined value of 1600 rpm, the clutch will be disengaged. When the angle of declination is above a third predetermined slope, for instance an eight percent grade, then the clutch will remain engaged.

hi accordance with this description, the present invention provides an apparatus and method for selectively disengaging a drive train and wheels of a vehicle in the event of a wheel lock-up situation. It should be appreciated by those having ordinary skill in the art that while the present invention has been illustrated and described in what is deemed to be exemplary and preferred embodiments, various changes and modifications may be made to the invention without departing from the spirit and scope of the invention. Therefore, it should be understood that the present invention is not limited to the particular embodiments disclosed herein, but instead is limited by the scope and breadth of the patented claims.

What is claimed is:

1. In a vehicle comprising an automatic mechanical transmission system and an antilock braking system, a method for selectively decoupling the drive train from the wheels of the vehicle comprising:

sensing at least one operational state of the vehicle;
sensing a wheel-lock up condition of the vehicle;
communicating the operational state and the wheel lock up condition of the vehicle to a logic control unit; and
disengaging the drive train from the vehicle wheels when a first predetermined operational state of the vehicle and wheel lock-up condition is communicated by the logic control unit and maintaining engagement of the drive train and the wheels of the vehicle when a second predetermined operational state of the vehicle and wheel lock-up condition is communicated by the logic control unit, wherein the second predetermined operational state corresponds to a state in which the vehicle is one or more of descending an incline, transporting a load, has engine braking power, and operating in a predetermined configuration.

2. The method of claim 1, wherein the second predetermined operational state of the vehicle corresponds to an angle of declination of the vehicle.

3. The method of claim 2, wherein the angle of declination is greater than a predetermined angle.

4. The method of claim 3, wherein the predetermined angle is three degrees.

5. The method of claim 3, wherein the predetermined angle is five degrees.

6. The method of claim 1, wherein the second predetermined operational state of the vehicle corresponds to an angle of declination of the vehicle and a speed of an engine of the vehicle.

7. The method of claim 6, wherein the angle of declination is greater than a predetermined angle.

8. The method of claim 6, wherein the speed of the engine is above a predetermined value.

9. The method of claim 8, wherein the predetermined speed value is the stall speed of the engine.

10. The method of claim 1, wherein the first predetermined operational state of the vehicle corresponds to operation on substantially flat ground.

11. The method of claim 1, wherein the operational state is determined using vehicle mass.

12. The method of claim 1, wherein the operational state is determined using angle of inclination of the vehicle.

13. The method of claim 1, wherein the operational state is determined using engine braking power.

14. The method of claim 1, wherein the operational state is determined using vehicle configuration.

15. The method of claim 14, wherein the vehicle configuration is a number of drivewheels compared to a total number of wheels.

16. In a vehicle comprising an automatic mechanical transmission system and an antilock braking system, an apparatus for selectively decoupling a drive train from wheels of the vehicle comprising:

a first sensor for sensing at least one operational state of the vehicle;
a second sensor for sensing a wheel-lock up condition of the vehicle; and
a logic control unit; wherein
the logic control unit receiving signals from the first and second sensors and being operatively arranged to direct the disengagement of the drive train from the wheels when the at least first sensor senses a first predetermined operational state of the vehicle and the second sensor senses a wheel-lockup condition and the logic control unit being operatively arranged to maintain engagement of the drive train and the wheels when a second predetermined operational state of the vehicle and wheel lock-up condition is sensed, wherein the second predetermined operational state corresponds to a state in which the vehicle is one or more of descending an incline, transporting a load, has engine braking power, and operating in a predetermined configuration.

17. The apparatus of claim 16, wherein the second predetermined operational state of the vehicle corresponds to an angle of declination of the vehicle.

* * * * *